Patented Nov. 15, 1949

2,488,449

UNITED STATES PATENT OFFICE 2,488,449

ORGANO-SILICON-PHOSPHORUS CONDENSATION PRODUCTS

Charles E. Trautman, Cheswick, Pa., assignor to Gulf Research & Development Company, Pittsburgh, Pa., a corporation of Delaware No Drawing. Application September 11, 1946, Serial No. 696,379

10 Claims. (Cl. 260—448.2)

This invention relates to new chemical products, and in particular concerns organo-silicon-phosphorus condensation products obtained as products of reaction between an ortho-phosphoric acid compound having the general formula:

$$\begin{array}{c} R-O \\ M-O-P=O \\ R'-O \end{array}$$

wherein M represents a hydrogen or an alkali-metal atom and R and R' each represents a hydrogen or an alkali-metal atom or an alkyl radical, and a silicon halide compound having the general formula $$Y-\underset{Y'}{\overset{X}{\underset{|}{Si}}}-Y''$$

wherein X represents a halogen atom and Y, Y' and Y'' each represents a halogen atom or an alkyl radical.

These products vary in physical properties from high-boiling viscous liquids to resin-like solids. They are substantially insoluble in water and aqueous solutions, but are soluble to varying degrees in a number of organic solvents, such as alcohol, ether, and chloroform. They are useful as intermediates in the preparation of a variety of other organic chemicals, and as plasticizing and modifying agents for various synthetic resin and plastic compositions. As disclosed in my co-pending application, Serial No. 696,378, filed September 11, 1946, they have been found especially useful as anti-foam agents in hydrocarbon oil compositions.

The new organo-silicon-phosphorus condensation products apparently vary in molecular structure from simple molecules of relatively low molecular weight to polymer-like chain molecules which may even be cross-linked to form cyclic structures. Thus, where the reactants each contain but one reactive substituent, as for example, in the case of mono-basic diethyl phosphate and trimethyl-chloro-silane, the reaction probably takes place according to the equation:

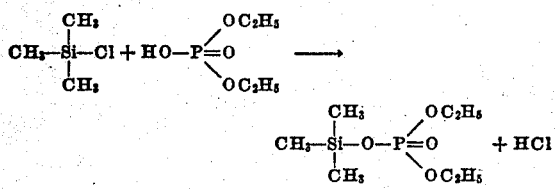

On the other hand, where the reactants contain more than one reactive substituent, the reaction may take place in several different ways, either successively or concurrently, giving rise to products of more complicated molecular structure. Thus, the reaction between dibasic methyl phosphate and diethyl-dichloro-silane may take place in two ways, according to the equation:

(1) 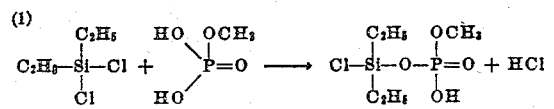

(2) 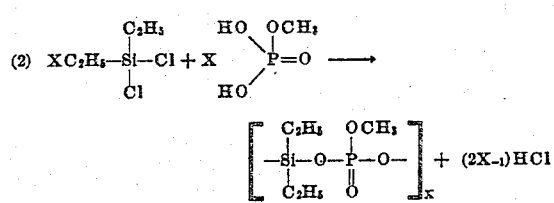

While it is possible to postulate reaction equations such as those above, the exact molecular structure of the reaction products cannot be stated with certainty since in some cases the several possible reactions may take place at different rates and go to various degrees of completion. The fact that the reaction products take the form of high-boiling liquids or resin-like solids makes them very difficult to purify and analyze. Furthermore, since in many cases the reactants themselves cannot be obtained in pure form, the reaction products may often consist of complex mixtures of several organo-silicon-phosphorus compounds. For these reasons the new products provided by the invention are herein described and claimed as reaction products rather than as pure chemical compounds.

The phosphoric acid reactant of the above general formula may be ortho-phosphoric acid itself or a mono- or di-alkyl ester thereof, or an alkali-metal salt of such acid or partial ester. As examples of such reactants there may be mentioned mono-basic disodium phosphate, di-basic methyl phosphate, mono-basic diethyl phosphate, mono-basic ethyl isopropyl phosphate, potassium ethyl hexyl phosphate, mono-basic ethyl octadecyl phosphate, mono-basic sodium octyl phosphate, mono-basic di-tertiarybutyl phosphate, di-basic isoamyl phosphate, di-basic dodecyl phosphate, etc.

The silicon halide reactant may be (1) a silicon tetrahalide, such as silicon tetrachloride or silicon tetraiodide; (2) a tri-halo-silane, such as trichloro-ethyl-silane, tribromo-octyl-silane, trichloro-decyl-silane, or tri-iodo-isopropyl-silane; (3) a dihalo-silane, such as dichloro-dimethyl-silane, dichloro - di-tertiarybutyl-silane, chloro - bromo - diethyl - silane; dibromo-di-isoamyl-silane, dichloro-methyl-ethyl-silane, or dibromo-dihexyl-silane; or (4) a mono-halo-silane, such as trimethyl-chloro-silane, tri-isopropyl-bromo-silane, methyl-diethyl-bromo-silane, tri-n-butyl-iodo-silane, or methyl-ethyl-isoamyl-bromo-silane.

Since the new products provided by the invention all contain at least one organic radical, it will be seen that when free phosphoric acid or an alkali-metal salt thereof is employed as a reactant, the silicon halide reactant must contain at least one alkyl substituent, i. e., it must be a mono-, di-, or tri-halo-silane. Conversely, when a silicon tetrahalide is employed, the phosphoric acid reactant must be a mono- or di-alkyl phosphate or alkali-metal salt thereof. Products of the latter type may be prepared from the free acid by first reacting the acid with an alcohol to form a partial alkyl ester, and thereafter reacting such ester directly and without isolation with the silicon halide.

The reaction between the phosphoric acid compounds and the silicon halides to form the new organo - silicon - phosphorus condensation products is usually exothermic, and accordingly may be carried out simply by admixing the two anhydrous reactants in the desired chemically equivalent proportions. In order to promote smooth reaction and intimate contact between the reactants, it is preferable to carry out the reaction in the presence of an inert organic solvent, such as benzene or toluene, which is subsequently removed by evaporation or distillation. In some instances the reaction may be only slightly exothermic, in which case it may be initiated and maintained by heating the mixture to a temperature of about 60°–120° C. Upon completion of the reaction, the crude product is usually purified by washing or extraction with water and/or a suitable organic solvent. Where the phosphoric acid reactant is employed in the form of an alkali-metal salt, the reaction product is usually first mixed with water to dissolve the alkali-metal halide by-product, and the aqueous mixture is then extracted with ethyl ether or other water-immiscible organic solvent to isolate the desired organo-silicon-phosphorus product. In other instances, the reaction product may be purified by fractional distillation under vacuum, although most of the reaction products of the present class are too high-boiling to make purification by distillation commercially feasible.

The following examples will illustrate the preparation of several of the products provided by the invention, but are not to be construed as limiting the invention. All proportions given are by weight.

Example I

Approximately 100 parts of ethyl isoamyl acid phosphate were dissolved in about 1320 parts of benzene, to which solution there were then added approximately 59 parts of silicon tetrachloride. The silicon tetrachloride was added dropwise with stirring, and during the addition the mixture became warm, and a gel-like mass formed in the benzene solution. This solid product was filtered off and was dried in a vacuum oven maintained at a temperature of about 60° C. The organo-silicon-phosphorus product so obtained was a brown semi-solid material which was found to have excellent foam-preventive properties in mineral oil compositions.

Example II

Disodium ethyl phosphate was prepared by treating 100 parts of dibasic ethyl phosphate with 64 parts by weight of sodium hydroxide in the form of an aqueous solution. Approximately 100 parts of the solid salt so prepared were then placed in a flask, and 76 parts of dimethyl-dichloro-silane were added dropwise with stirring. During such addition, the mixture became warm and partially liquified. Upon completion of the reaction, sufficient water was added to the mixture to dissolve the white crystalline solid which had precipitated during the reaction. The aqueous mixture was then mixed with an equal volume of ethyl ether, and the layers were separated. Upon evaporation of the ether layer there remained two immiscible liquids, one of which was insoluble in ethyl alcohol. Accordingly, the liquid mixture was treated with ethyl alcohol, and after separation of the layers and evaporation of the alcohol, there was obtained a brown mobile liquid which was found by chemical analysis to contain about 19.4 per cent by weight of phosphorus.

Example III

Approximately 100 parts of sodium ethyl isoamyl phosphate were treated with 30 parts of dimethyl-dichloro-silane as in Example II. The crude reaction product was mixed with water and successively extracted with ether and ethyl alcohol as in Example II, whereby the organo-silicon-phosphorus product was recovered from the alcoholic extract as a light brown mobile liquid. This product had the following approximate chemical analysis:

|  | Percent by weight |
|---|---|
| Carbon | 43.8 |
| Hydrogen | 9.3 |
| Phosphorus | 14.3 |
| Silicon | 16.1 |
| Oxygen (by difference) | 16.5 |

Example IV

Approximately 50 parts of silicon tetrachloride were added dropwise with stirring to a solution of approximately 200 parts of methyl octadecyl acid phosphate in 2200 parts of benzene. During such addition the mixture became warm and an insoluble gel formed. The benzene was evaporated off, whereby the desired reaction product was obtained as a brown soft resinous solid.

Example V

Approximately 30 parts of dimethyl-dichloro-silane were added to 100 parts of sodium methyl octadecyl phosphate as in Example I. The crude reaction product was dried for several hours in a vacuum oven at a temperature of about 60° C. to remove any unreacted dimethyl-dichloro-silane, and was then shaken with ethyl ether and water. The ether layer was separated and the ether was removed by evaporation, whereby the desired reaction product was obtained as a white semi-solid. It had the following approximate chemical analysis:

|  | Percent by weight |
|---|---|
| Carbon | 66.11 |
| Hydrogen | 11.41 |
| Phosphorus | 4.10 |
| Silicon | 11.27 |
| Oxygen (by difference) | 7.11 |

This product was found to be effective as an anti-foaming agent in lubricating oil compositions when employed in amounts as small as 50 parts per million.

Those skilled in the art will recognize that the reaction product is the same whether the alkyl ortho-phosphoric acid esters are employed for reaction with the silicon compounds in the free acid form or in the alkali-metal salt form. Accordingly, when in the appended claims a reaction product of a mono-alkyl or di-alkyl ortho-phosphoric acid ester is referred to, it will be understood that the ester can have been employed in either the free acid or alkali-metal salt form for reaction with a silicon compound.

Other modes of applying the principle of my invention may be employed instead of those explained, change being made as regards the methods or ingredients employed provided the products stated by any of the following claims be obtained.

I therefore particularly point out and distinctly claim as my invention:

1. An organo-silicon-phosphorus product of reaction between sodium methyl octadecyl phosphate and dimethyl-dichloro-silane.

2. An organo-silicon-phosphorus product of reaction between disodium ethyl phosphate and dimethyl-dichloro-silane.

3. An organo-silicon-phosphorus product of reaction between ethyl isoamyl acid phosphate and silicon tetrachloride.

4. An organo-silicon-phosphorus recation product between an ortho-phosphoric acid ester selected from the group consisting of the mono-alkyl and di-alkyl ortho-phosphoric acid esters in which the alkyl groups contain from 1 to 18 carbon atoms, and a silicon halide compound having the general formula:

wherein X represents a halogen atom, and Y, Y' and Y'' each represents a substituent selected from the class consisting of halogen atoms and alkyl radicals containing from 1 to 6 carbon atoms.

5. An organo-silicon-phosphorus reaction product between a mono-alkyl ortho-phosphoric acid ester in which the alkyl group contains from 1 to 18 carbon atoms, and a silicon halide compound having the general formula:

wherein X represents a halogen atom, and Y, Y' and Y'' each represents a substituent selected from the class consisting of halogen atoms and alkyl radicals containing from 1 to 6 carbon atoms.

6. A reaction product as defined in claim 5 in which said silicon halide compound is silicon tetrachloride.

7. A reaction product as defined in claim 5 in which said silicon halide compound is a di-alkyl-dichloro-silane in which the alkyl groups contain from 1 to 6 carbon atoms.

8. An organo-silicon-phosphorus reaction product between a di-alkyl ortho-phosphoric acid ester in which the alkyl groups contain from 1 to 18 carbon atoms, and a silicon halide compound having the general formula:

wherein X represents a halogen atom, and Y, Y' and Y'' each represents a substituent selected from the class consisting of halogen atoms and alkyl radicals containing from 1 to 6 carbon atoms.

9. A reaction product as defined in claim 8 in which said silicon halide compound is silicon tetrachloride.

10. A reaction product as defined in claim 8 in which said silicon halide compound is a di-alkyl-dichloro-silane in which the alkyl groups contain from 1 to 6 carbon atoms.

CHARLES E. TRAUTMAN.

REFERENCES CITED

The following references are of record in the file of this patent:

Sauer: "Jour. Am. Chem. Soc.," vol. 66 (1944), pages 1707–1710.

Mellor: "Comprehensive Treatise on Inorganic and Theoretical Chemistry," (1923), vol. VI, page 990.